United States Patent
Suel, II et al.

(10) Patent No.: US 12,261,714 B2
(45) Date of Patent: Mar. 25, 2025

(54) SERVICE MODE INDICATION FOR DOMESTIC APPLIANCES

(71) Applicant: Haier US Appliance Solutions, Inc., Wilmington, DE (US)

(72) Inventors: Richard Dean Suel, II, Louisville, KY (US); Victor Suarez, Lousiville, KY (US); Mark Allen Butler, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 325 days.

(21) Appl. No.: 17/714,354

(22) Filed: Apr. 6, 2022

(65) Prior Publication Data
US 2023/0327905 A1    Oct. 12, 2023

(51) Int. Cl.
*H04L 12/28* (2006.01)
*H04W 76/10* (2018.01)
*H04W 84/12* (2009.01)

(52) U.S. Cl.
CPC ......... *H04L 12/2838* (2013.01); *H04W 76/10* (2018.02); *H04L 2012/2841* (2013.01); *H04L 2012/285* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,338,633 B2 | 5/2016 | Choi et al. | |
| 10,749,973 B2 | 8/2020 | Qi et al. | |
| 2009/0012674 A1* | 1/2009 | McGuffin | G06F 11/2294 701/32.8 |
| 2013/0024385 A1* | 1/2013 | Kang | G01D 4/002 700/83 |
| 2014/0195864 A1* | 7/2014 | Dempski | H04L 41/5074 714/57 |
| 2016/0219141 A1* | 7/2016 | Kant | H04M 1/72415 |
| 2020/0217123 A1* | 7/2020 | Minoike | G06Q 30/0272 |
| 2021/0014314 A1* | 1/2021 | Yamada | H04L 67/52 |
| 2021/0297317 A1 | 9/2021 | Thompson et al. | |
| 2021/0335488 A1* | 10/2021 | Higginson | H04B 17/318 |
| 2022/0044799 A1* | 2/2022 | Tallent | G16H 40/63 |

FOREIGN PATENT DOCUMENTS

KR    20200117159 A    10/2020

* cited by examiner

*Primary Examiner* — Lonnie V Sweet
(74) *Attorney, Agent, or Firm* — Dority & Manning, P.A.

(57) ABSTRACT

A domestic appliance includes a wireless transmitter provided within the domestic appliance, the wireless transmitter configured to emit a signal; a wireless communication module provided within the domestic appliance, the wireless communication module establishing a wireless connection between the appliance and a remote terminal; and a controller provided within the domestic appliance. The controller is configured for emitting, via the wireless communication module, the signal, wherein the signal contains a table of information uniquely associated with the domestic appliance, the table of information comprising a model identification and an indication of wireless connectivity.

18 Claims, 5 Drawing Sheets

SERVICE MODE INDICATION FOR DOMESTIC APPLIANCES

FIELD OF THE INVENTION

The present subject matter relates generally to domestic appliances, and more particularly to managing wireless connection and service of domestic appliances.

BACKGROUND OF THE INVENTION

Domestic (e.g., household or consumer) appliances are generally used for a variety of tasks by a variety of users. For example, a household may include such appliances as laundry appliances (e.g., a washing machine or dryer appliance), kitchen appliances (e.g., a refrigerator, a microwave, a coffee maker, etc.), along with room air conditioners and various other appliances. Some domestic appliances can also include features for connecting to and communicating over a secure wireless network. Such communication may provide connected features on the domestic appliances to permit the domestic appliance to communicate with a personal device, smart home systems, or a remote database such as a cloud server.

These domestic appliances occasionally require service or maintenance to remain properly functional throughout their lifetime. Conventionally, a technician uses one or more cables to connect an external device to the appliance in order to gain access and perform diagnostic operations on the appliance. Some service methods may include allowing a technician to place the domestic appliance into a service mode before establishing a secure wireless connection between the domestic appliance and a remote terminal for servicing (e.g., in order to perform various diagnostic sequences or retrieve certain data sets regarding the appliance's operation). In order to place the appliance into the service mode, a technician must first identify whether or not the appliance is capable of wireless service. However, it is not easily discernible which appliances within a domestic area are capable of wireless service.

Accordingly, a method of operating a domestic appliance that obviates one or more of the above-mentioned drawbacks would be beneficial. In particular, a method for determining a wireless service capability of the appliance would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a domestic appliance is provided. The domestic appliance may include a wireless transmitter provided within the domestic appliance, the wireless transmitter configured to emit a signal, a wireless communication module provided within the domestic appliance, the wireless communication module establishing a wireless connection between the domestic appliance and a remote terminal, and a controller provided within the domestic appliance, the controller being configured to perform a series of operations. The series of operations may include emitting, via the wireless communication module, the signal, wherein the signal contains a table of information uniquely associated with the domestic appliance, the table of information including a model identification and an indication of wireless connectivity.

In another exemplary aspect of the present disclosure, a method for initiating a service mode for a domestic appliance is provided. The domestic appliance may include a cabinet, a control input provided on the cabinet, a wireless communication module provided within the cabinet, and a controller operatively coupled with the control input and the wireless communication module. The method may include emitting, via the wireless communication module, a signal, wherein the signal contains a table of information uniquely associated with the domestic appliance, and determining that a remote terminal has received the signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally" or "about" include values within ten percent greater or less than the stated value. When used in the context of an angle or direction, such terms include within ten degrees greater or less than the stated angle or direction. For example, "generally vertical" includes directions within ten degrees of vertical in any direction.

Figure 1:
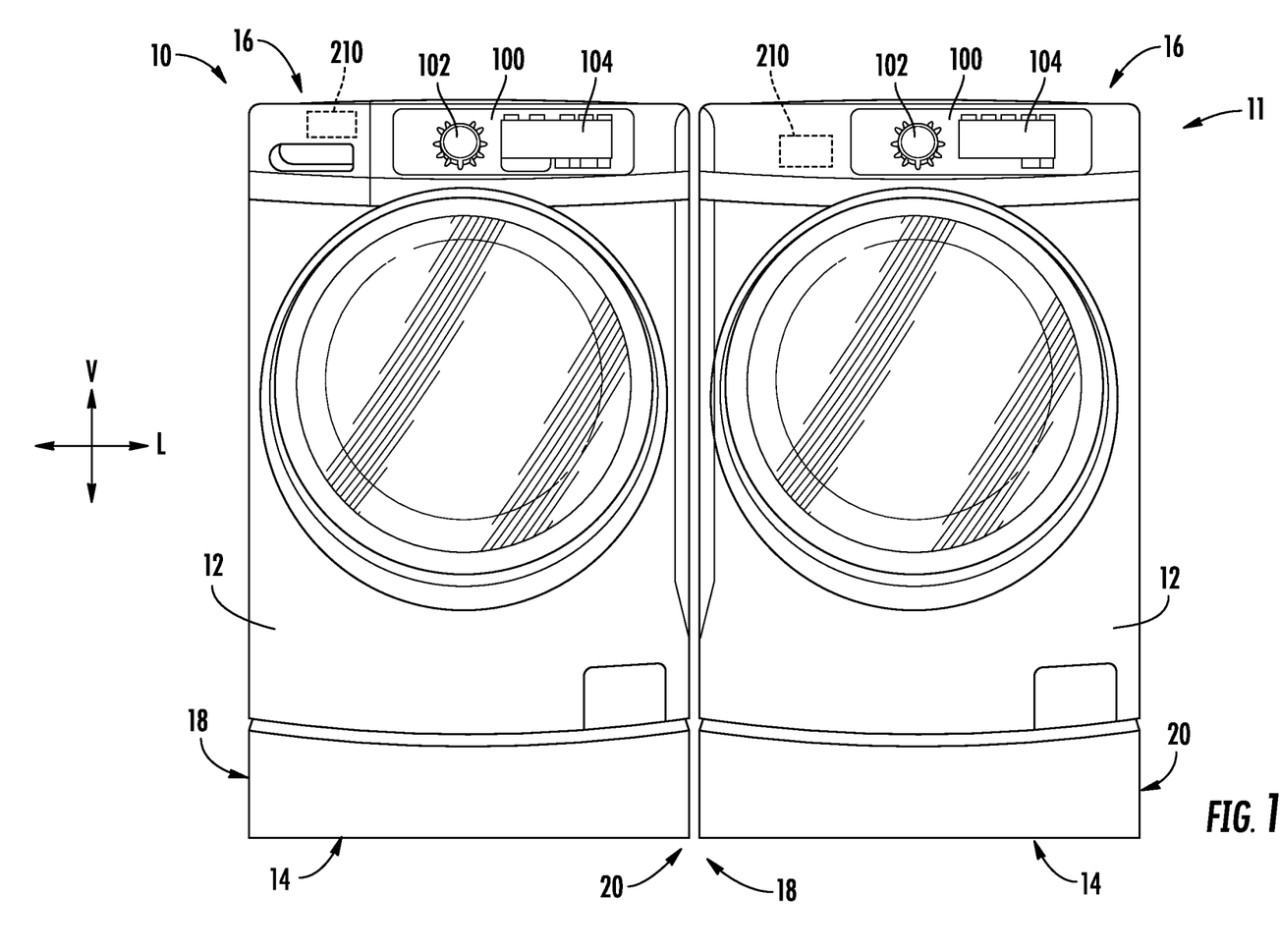
FIG. 1 provides a front, elevation view of laundry appliances in accordance with exemplary embodiments of the present disclosure.
Figure 2:
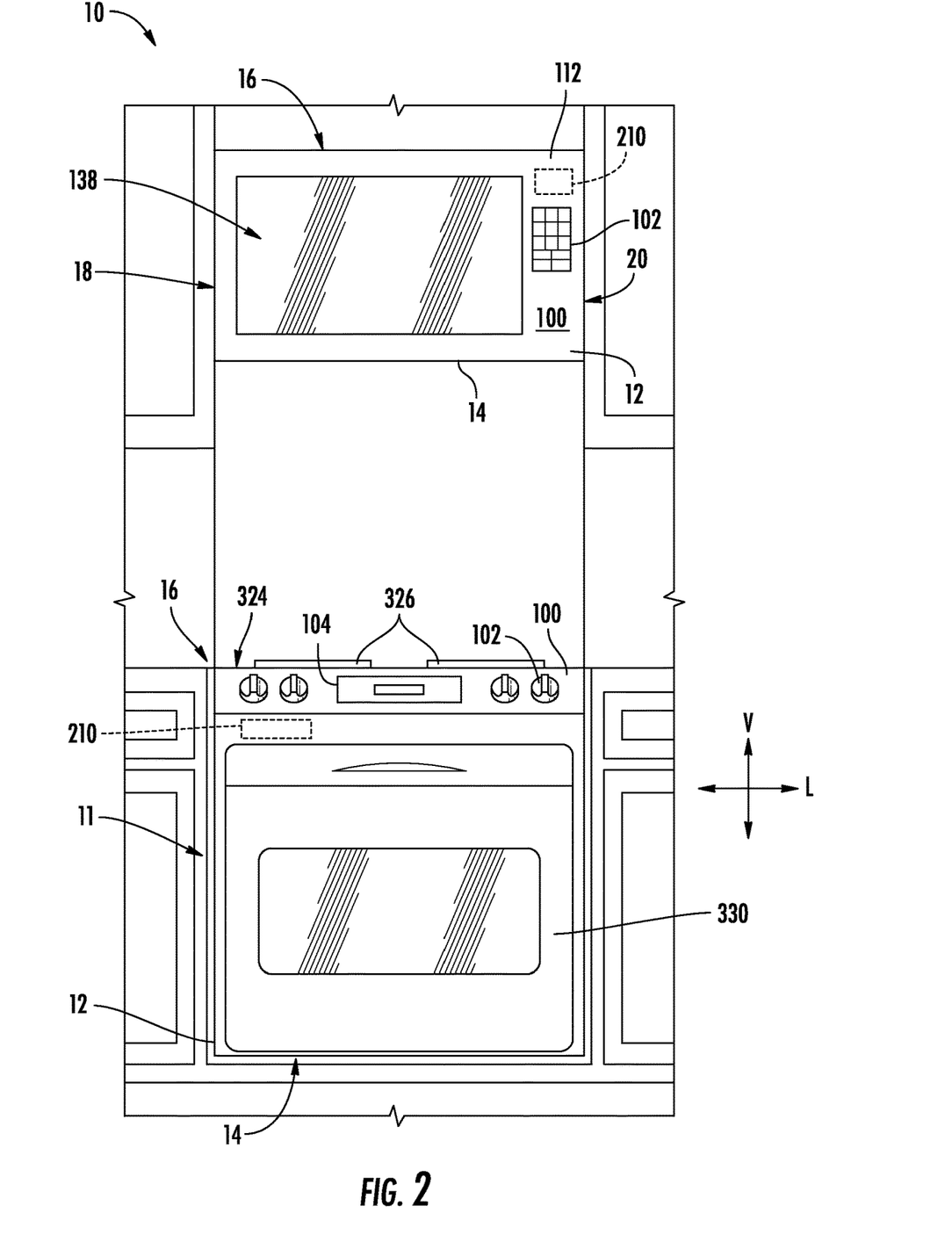
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include only one or three or more appliances.

As generally shown throughout FIGS. 1 and 2, each appliance 10 and 11 includes a cabinet 12 that defines a vertical direction V, a lateral direction L, and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102, which may be positioned on an exterior of the cabinet 12. The user input device 102 is generally positioned proximate to the user interface panel 100, and in some embodiments, the user input device 102 is positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance 10 and 11 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs, or the like, such as general or special purpose microprocessors operable to execute programming instructions or microcontrol code associated with operation of the appliance 10 or 11. The memory may represent random access memory such as DRAM, or read only memory such as ROM or FLASH. In some embodiments, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations, etc. and storing relevant data, as disclosed herein). It should be noted that controllers 210 as disclosed herein are capable of, and may be operable to perform, any methods and associated method steps (e.g., as, or as part of, a service operation) as disclosed herein.

In some embodiments, for example, as illustrated in FIG. 1, a pair of laundry appliances may be provided as the first appliance 10 and the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliances where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

The microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components that operate to produce the electromagnetic radiation, as is generally understood. For example, the microwave oven appliance may include a magnetron (such as, for example, a cavity magnetron), a high voltage transformer, a high voltage capacitor, and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, the cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable nonmetallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within the cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where improved ease of determining a wireless connection capability of the appliance is desired. Thus, it will be understood that the present subject matter is not limited to any particular domestic appliance.

Figure 3:
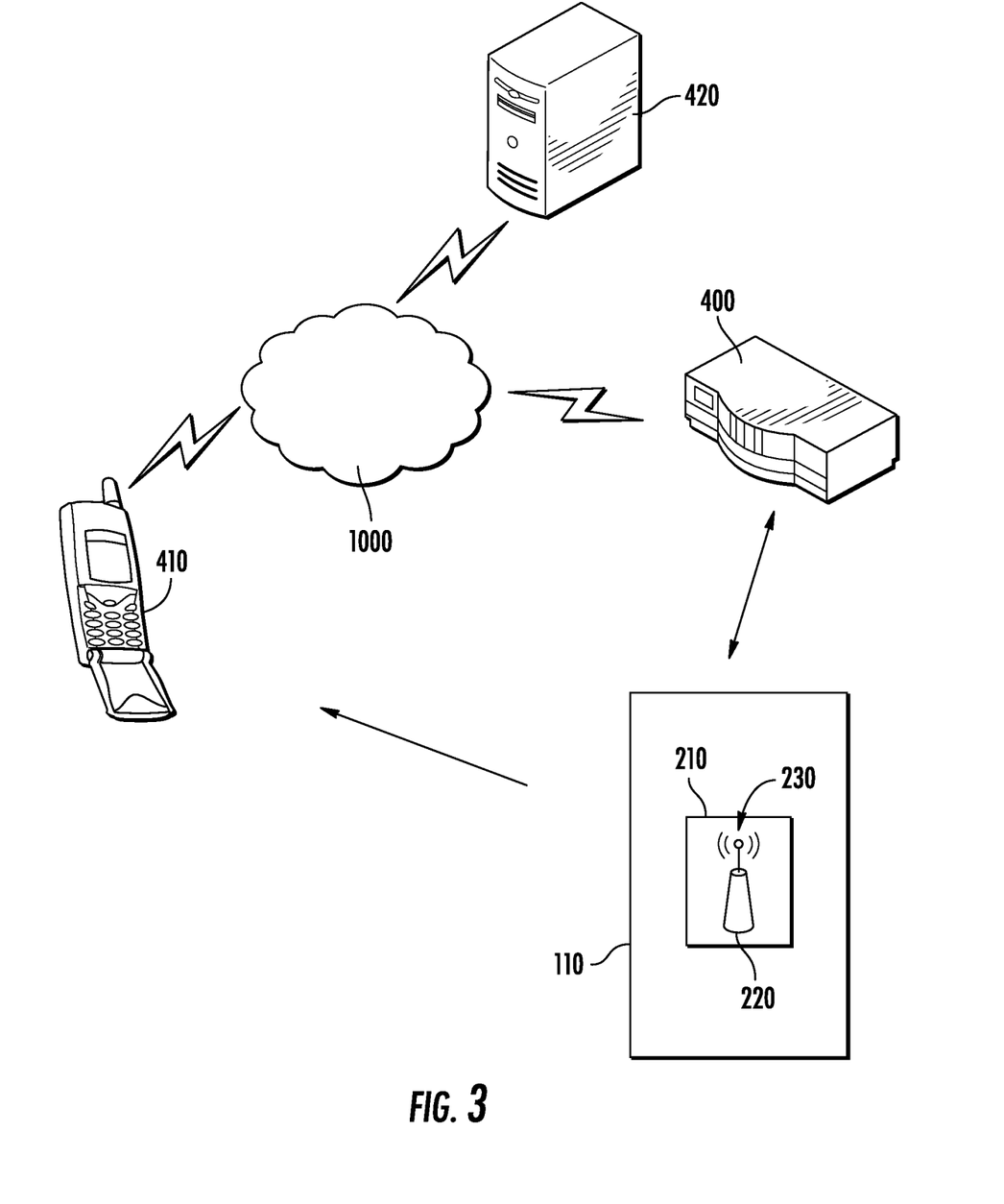
FIG. 3 provides a schematic view of an appliance performing a connection with a user device according to exemplary embodiments of the present disclosure.

Turning now generally to FIG. 3, an appliance 110 (e.g., first appliance 10 or second appliance 11—FIGS. 1 and 2) may be configured to communicate with each other or with one or more separate, external devices. For instance, controller 210 may be configured to communicate with a remote user interface device 410 or remote server 420, either directly or via one or more intermediate networks (e.g., a wide area network 1000, such as the internet). In some embodiments, the appliance 110 can access the wide area network 1000 via an access point, such as a modem or router 400, which may be part of a local, wireless network (e.g., WI-FI® or wireless network having a frequency between 1 GHz and 6 GHz).

The remote user interface device 410 may be a laptop computer, smartphone, tablet, personal computer, wearable device, smart home system, or various other suitable devices including a user interface (e.g., buttons or touchscreen display). In some embodiments, remote user interface device 410 includes a controller having a memory (e.g., non-transitive storage media) for storing and retrieving programming instructions. For example, the remote user interface device 410 may be a smartphone operable to store and run applications (i.e., "apps") and may include a remote user interface provided as a smartphone app. During use, appliance 110 may be in communication with the separate external device 410 or 420 through various possible communication connections and channels, such as but not limited to wireless radio frequency (RF) channels (e.g., ZIGBEE®, BLUETOOTH®, WI-FI®, etc.) or any other suitable communication connection.

Methods and systems according to the present disclosure advantageously provide an easy or secure user experience when engaging with an appliance 110. For example, engaging with the appliance 110 may include connecting the appliance 110 to a wireless (e.g., RF, WI-FI®, etc.) network or adding the appliance 110 to a user account on the remote server 420. Additionally or alternatively, engaging with appliance 110 may include wirelessly connecting to appliance 110 in a predetermined mode, such as a service mode.

FIG. 3 provides a schematic view of appliance 110 communicating with a remote user interface device 410 during an operation. In particular, the remote user interface device 410 may receive a signal from the controller 210 of appliance 110, (e.g., through a soft access point (soft AP) 220 on the controller 210). For instance, an initial communication from appliance 110 to remote user interface device 410 may be a one-way communication. Additionally or alternatively, the communication may be a short range communication, as will be described below. Accordingly, the communication may be a direct one-way communication (e.g., without the use of a network). Further, as described in more detail below with reference to FIG. 4, a bi-directional connection between remote user interface device 410 and appliance 110 may be established.

For instance, controller 210 (e.g., soft AP 220) may include a wireless transmitter 230. Wireless transmitter 230 may be configured to emit one or more signals according to a predetermined pattern. Wireless transmitter 230 may periodically emit a wireless beacon (e.g., via a short-range radio). As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance 110 and the remote user interface device 410. For example, BLUETOOTH® Low Energy may advantageously minimize the power consumed by the exemplary methods and devices described herein due to the low power networking protocol of BLUETOOTH® Low Energy. As another example, BLUETOOTH® Low Energy may advantageously provide improved accuracy in determining a distance X between the remote user interface device 410 and the appliance 110, which can allow the user to set the distance they wish to trigger actions on certain appliances. For instance, BLUETOOTH® Low Energy is more accurate than GPS and may provide fine grained location and distance from an appliance 110 and/or a particular appliance 110 of interest out of multiple appliances 110 (e.g., first and/or second appliances 10, 11).

In some embodiments, engaging with the appliance 110 (e.g., wirelessly connecting) is initiated by requesting to add the appliance 110 (e.g., to a user or service account) and by manipulating a user input 102 (e.g., pressing a button on the user interface of appliance 110). In detail, wireless transmitter 230 may be configured to emit a signal according to a predetermined pattern. The predetermined pattern may include repeated cyclic intervals. For instance, the cyclic intervals may be between about 5 seconds and about 20 seconds. In detail, wireless transmitter 230 may emit a first signal, pause for a predetermined amount of time (e.g., between about 5 seconds and about 20 seconds), and emit a second signal identical to the first signal. This pattern may be repeated indefinitely. Advantageously, the signal is emitted at regular intervals to be received at any opportune time (e.g., by remote user interface device 410). The signal may be a wireless low energy beacon. For instance, according to some embodiments, the signal is a BLUETOOTH® Low Energy beacon.

According to some embodiments, the signal is emitted by remote user interface device 410. For instance, remote user interface device 410 may include a wireless transmitter capable of emitting the signal. Consequently, the appliance 110 may include a wireless receiver configured to accept and recognize the signal released by remote user interface device 410. Upon determining that the signal has been received by the appliance, a prompt may be presented to an external user. For instance, the prompt may allow the user to enter a predetermined mode, such as a service mode. In some embodiments, the service mode includes providing or allowing access (e.g., remote access) to software, such as operating systems, within the appliance. The service mode may allow a technician to adjust certain operating parameters of the appliance while the appliance is in the service mode.

The signal may include one or more information packets or data sets. In detail, the signal may include a table of information. In some embodiments, the table of information is unique to the specific appliance from which it is emitted (i.e., a washing machine emits a signal having a first table of information, a microwave emits a signal having a second table of information, etc.). The table of information may include one or more identifying information bits such that each appliance is uniquely identified by a single signal. For instance, the table of information may include a model identification of the appliance, a serial identification of the appliance, a type of appliance, an indication of wireless connectivity to a particular operational mode, or the like. Additionally or alternatively, other forms of signals may be incorporated. Thus, each signal emitted by each appliance (e.g., first appliance 10, second appliance 11, etc.) may be unique to that individual appliance.

The signal may be deciphered or interpreted by a remote terminal (e.g., remote user interface device 410). For one example, the signal is interpreted by remote user interface device 410 and subsequently associated with its unique appliance. Once interpreted, the table of information may be displayed to an external user, such as a service technician (e.g., by remote user interface device 410). In detail, remote user interface device 410 may be a service terminal used by a technician to perform necessary maintenance and/or repairs on appliance 110. In order to gain access to the appliance, the technician may have to perform a unique key sequence on a user interface of appliance 110. Additionally or alternatively, the technician may wirelessly gain access to the appliance. For instance, the signal may provide an option for the technician to initiate a service mode of the appliance directly from the remote user interface device 410. In some embodiments, the soft AP 220 opens a connection channel (e.g., wireless RF channel) through which the remote user interface device 410 may connect to and communicate with the appliance 110.

Figure 4:
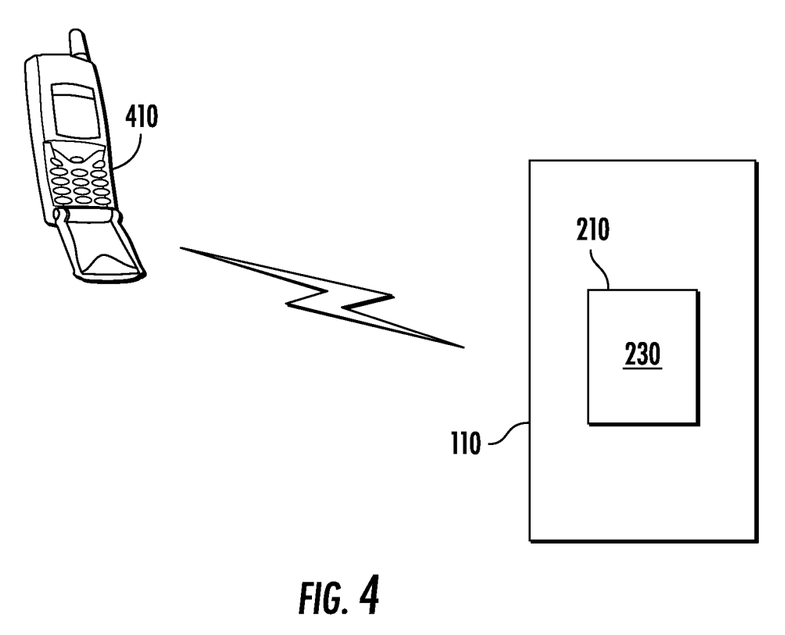
FIG. 4 provides a schematic view of an appliance communicating in a predetermined service mode according to exemplary embodiments of the present disclosure.

FIG. 4 provides a schematic illustration of a wireless connection between a remote terminal and an appliance via a network. For instance, remote user interface device 410, upon receiving the signal, may communicate with a cloud network (e.g., wide area network 1000) to trigger appliance 110 to initiate a local wireless network. In detail, the local wireless network may permit local devices (e.g., within a limited physical range of appliance 110) to connect directly with appliance 110, such as remote user interface device 410. Additionally or alternatively, the connection may be a secure connection established with a unique identifier of appliance 110 (e.g., a unique code). In other words, the connection may be limited to being only between remote user interface device 410 and appliance 110 (e.g., through the secure network). In some embodiments, the connection is performed through the soft AP 220. In detail, soft AP 220 may have a programed service set identifier (SSID) format. The SSID format may permit the remote user interface device 410 to recognize the soft AP 220 via the connection channel. For example, the SSID format may be preprogrammed into a memory of the controller 210 and made visible to the remote user interface device 410 (e.g., such that a user can scan for and select the open connection channel at the soft AP 220 as a WI-FI® network connection).

Figure 5:
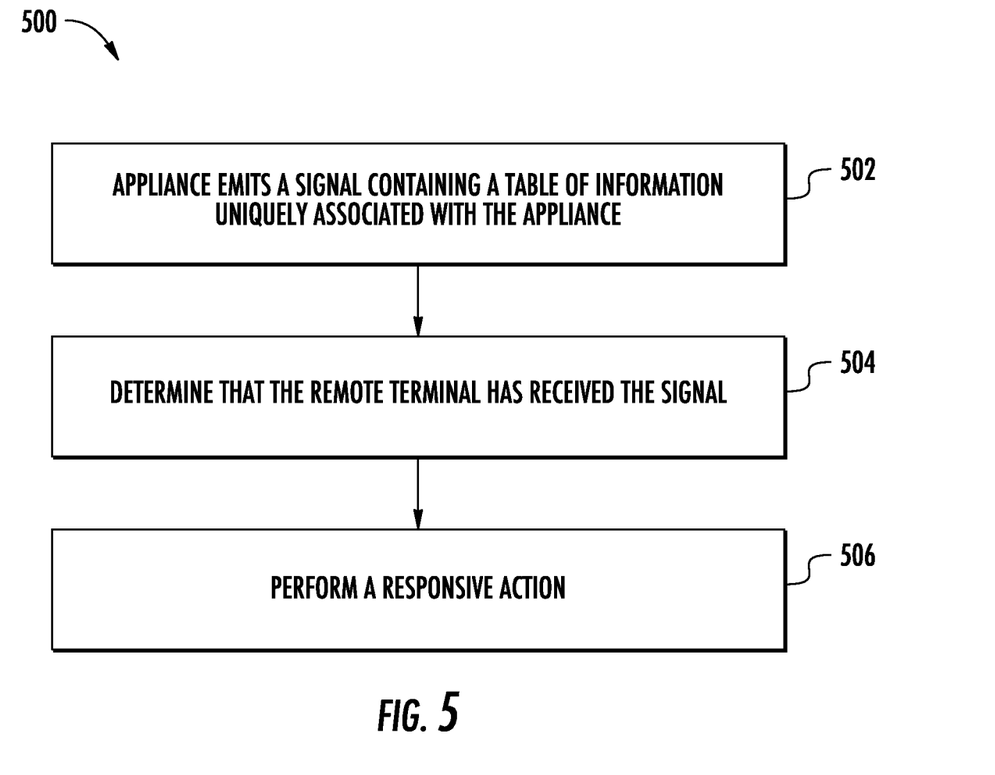
FIG. 5 provides a flow chart illustrating a method of operating an appliance according to exemplary aspects of the present disclosure.

Now that the general descriptions of an exemplary appliance have been described in detail, a method 500 of operating an appliance (e.g., appliance 110) will be described in detail. Although the discussion below refers to the exemplary method 500 of operating appliance 110, one skilled in the art will appreciate that the exemplary method 500 is applicable to any suitable domestic appliance capable of wireless connection (e.g., such as a washing machine/dryer, a refrigerator, a cooking appliance, etc.). In exemplary embodiments, the various method steps as disclosed herein may be performed by controller 210 and/or a separate, dedicated controller. FIG. 5 provides a flow chart illustrating a method of operating an appliance. Hereinafter, method 500 will be described with specific reference to FIG. 5.

At step 502, method 500 includes emitting, via a wireless communication module, a signal containing a table of information uniquely associated with an appliance. For instance, a domestic appliance (such as a dishwasher, refrigerator, oven, washing machine, etc.) may emit a signal via a BLUETOOTH® Low Energy wireless transmitter according to a predetermined cycle. As explained above, the emitted signal may contain a table of information related to the appliance. Each of a plurality of domestic appliances may emit a unique signal (e.g., including a unique table of information) according to regular intervals. According to at least some embodiments, the unique table of information allows an external user (e.g., service technician) to identify each connected appliance.

At step 504, method 500 includes determining that a remote terminal has received the signal. For instance, a remote terminal may receive the signal and interpret the table of information. In detail, the external user may provide the remote terminal (e.g., remote user interface device 410) within a connectable distance of the appliance (or appliances). The remote terminal may include a software tool able to receive and decipher or interpret the table of information. Thus, the remote terminal may recognize the signal and receive the table of information therein. As described above, the remote terminal may be a connectable device such as a laptop computer, a smartphone, a tablet, or the like.

Upon receiving the one or more unique signals (for each connectable appliance, for instance), the remote terminal may interpret and organize the signals according to the associated appliances. According to at least some embodiments, the remote terminal determines which of the appliances are capable of entering an access point (AP) service mode (e.g., a wireless connection service mode). The remote terminal, upon receiving the signals, may reference the organized signals and present a list of appliances capable of entering the AP service mode.

At step 506, the remote terminal may perform a responsive action. In detail, as described above, entering a specific mode of the appliance (e.g., a service mode) may require a specific key sequence to be entered into a user interface of the appliance. Accordingly, the information provided within the table may include the unique key sequence associated with the particular appliance.

The unique key sequence may include an identification of specific keys, a number of presses of the specific keys, an amount of time for which to press-and-hold the specific keys, or a pattern of pressing predetermined keys. For one example, the unique key sequence includes pressing and holding each of a "Start" key and an "Options" key on the user interface for 4 seconds. It should be understood that the unique key sequence may be any suitable combination of button presses, knob turns, key patterns, switch activations, or the like.

Additionally or alternatively, the service technician may be provided with a wireless input command to be input to the remote terminal in order to access a predetermined operational mode of the appliance (e.g., a wireless service mode). Additionally or alternatively, the remote terminal may initiate and send a message to the appliance (e.g., via a secure wireless connection) to initiate the predetermined operational mode (e.g., service mode). In detail, the remote terminal may include a software tool that determines the unique access code to enter into a service mode of the appliance. The remote terminal may then send a request to the appliance to enter the service mode. The request may instruct the appliance to automatically begin communicating with the remote terminal (e.g., within the service mode).

For instance, upon detecting the signal and recognizing the appliance, the remote terminal may send an enabling message to the appliance. The enabling message may be sent via the secure wireless connection. In detail, the appliance may include an internal wireless router that connects the appliance to, for example, the internet. According to at least some embodiments, the appliance (e.g., the internal wireless router) allows the appliance to communicate with a secure cloud (e.g., wide area network 1000) through a local wireless network such as a home network. The remote terminal may communicate with the secure cloud via a separate wireless connection (such as a cellular connection, for example). In some embodiments, a combination wireless communication module is provided incorporating each of the wireless transmitter and the wireless communication module.

The method 500 may further include the appliance receiving the input command via one or more control inputs (e.g., on the user interface). After inputting the command to the appliance, the controller of the appliance may place the appliance in the requested operational mode (e.g., service mode via a wireless connection). According to at least one example, the appliance displays an acceptance notification on the user interface of the appliance. A password may be required to initiate the wireless connection. Upon entering the password, a two-way direct wireless connection may be established between the appliance and the remote terminal (e.g., in the AP service mode). Advantageously, an appliance may be quickly and easily placed into a service mode without the need for a cumbersome wired connection or extensive interface manipulation to gain service access.

According to the embodiments described herein, a method for operating a domestic appliance is provided. The domestic appliance may include a wireless communication module, a wireless transmitter, and a user interface including one or more buttons. The wireless transmitter may be configured to emit a signal such as a wireless beacon at regular intervals. The signal may be recognized by a mobile terminal such as a laptop computer. The signal may include a predetermined code including one or more characters. The mobile terminal may decipher or interpret the predetermined code and display a control key sequence that places the appliance in a predetermined operating mode. The predetermined operating mode may be a service mode, such as an access point (AP) service mode. In detail, the predetermined operating mode may be a mode that allows a user (e.g., a service technician) to access software or firmware code, for example, via a remote connection. Accordingly, the user may perform certain maintenance, install updates, or the like via the predetermined operating mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A domestic appliance, comprising:
 a wireless transmitter provided within the domestic appliance, the wireless transmitter configured to emit a signal;
 a wireless communication module provided within the domestic appliance, the wireless communication module establishing a wireless connection between the domestic appliance and a remote terminal; and a controller provided within the domestic appliance, the controller being configured to perform a series of operations, the series of operations comprising:

emitting, via the wireless communication module, the signal, wherein the signal contains a table of information uniquely associated with the domestic appliance, the table of information comprising a model identification and an indication of whether the domestic appliance supports a local wireless network;

initiating a local wireless network via a user interface panel; and establishing the wireless connection through the local wireless network, wherein the local wireless network is a direct connection between the remote terminal and the domestic appliance.

2. The domestic appliance of claim 1, wherein the signal is a wireless low energy beacon.

3. The domestic appliance of claim 2, wherein the wireless low energy beacon is emitted at repeated cyclic intervals.

4. The domestic appliance of claim 2, wherein the wireless low energy beacon is received by the remote terminal, the remote terminal comprising a wireless receiver.

5. The domestic appliance of claim 1, wherein the table of information is displayed on a display of the remote terminal.

6. The domestic appliance of claim 1, wherein the remote terminal determines that the domestic appliance is capable of wireless connection in a predetermined mode based on the indication of whether the domestic appliance supports the local wireless connection.

7. The domestic appliance of claim 6, wherein the predetermined mode is a wireless service mode of the domestic appliance.

8. The domestic appliance of claim 1, wherein the series of operations further comprises:

receiving a wireless input request from the remote terminal to perform the wireless connection between the domestic appliance and the remote terminal;

initiating a local wireless network via the wireless communication module; and establishing the wireless connection through the local wireless network, wherein the local wireless network is a direct connection between the remote terminal and the domestic appliance.

9. The domestic appliance of claim 1, wherein the wireless transmitter and the wireless communication module are provided as a single combination wireless module.

10. A method for initiating a service mode for a domestic appliance, the domestic appliance comprising a cabinet, a control input provided on the cabinet, a wireless communication module provided within the cabinet, and a controller operatively coupled with the control input and the wireless communication module, the method comprising:

emitting, via the wireless communication module, a signal, wherein the signal contains a table of information uniquely associated with the domestic appliance, including an indication of whether the domestic appliance supports an access point service;

initiating a local wireless network via a user interface panel;

establishing the wireless connection through the local wireless network, wherein the local wireless network is a direct connection between the remote terminal and the domestic appliance; and determining that a remote terminal has received the signal.

11. The method of claim 10, wherein the table of information comprises a model identification and an indication of wireless connectivity.

12. The method of claim 11, wherein the signal is a wireless low energy beacon.

13. The method of claim 12, wherein the wireless low energy beacon is emitted at repeated cyclic intervals.

14. The method of claim 12, wherein the wireless low energy beacon is received by the remote terminal, the remote terminal comprising a wireless receiver.

15. The method of claim 11, further comprising:

receiving a wireless input request from the remote terminal to perform the wireless connection between the domestic appliance and the remote terminal;

initiating the access point service via the wireless communication module; and establishing the wireless connection through the local wireless network, wherein the local wireless network is a direct connection between the remote terminal and the domestic appliance.

16. The method of claim 10, wherein the table of information is displayed on a display of the remote terminal.

17. The method of claim 16, wherein the remote terminal determines that the domestic appliance is capable of wireless connection in a predetermined mode based on the indication of whether the domestic appliance supports an access point service.

18. The method of claim 17, wherein the predetermined mode is a wireless service mode of the domestic appliance.

* * * * *